United States Patent [19]

Yajima et al.

[11] Patent Number: 4,903,000
[45] Date of Patent: Feb. 20, 1990

[54] PRESSURE SENSOR HAVING MEANS FOR ELECTROMAGNETICALLY SHIELDING RESISTORS

[75] Inventors: Yasuhito Yajima, Nagoya; Syunzo Mase, Tobishima, both of Japan

[73] Assignee: NGK Insulators, Ltd., Nagoya, Japan

[21] Appl. No.: 277,188

[22] Filed: Nov. 29, 1988

[30] Foreign Application Priority Data

Dec. 3, 1987 [JP] Japan .................................. 62-306100

[51] Int. Cl.$^4$ ............................................... G01L 1/22
[52] U.S. Cl. ............................................ 338/4; 338/5
[58] Field of Search ....................... 338/2, 4, 5, 64, 65, 338/42; 73/724, 725

[56] References Cited

U.S. PATENT DOCUMENTS

| | | | |
|---|---|---|---|
| 2,599,578 | 6/1952 | Obert et al. | 338/64 X |
| 4,204,244 | 5/1980 | Ho | 73/724 X |
| 4,217,783 | 8/1980 | Ito et al. | 338/4 X |
| 4,311,980 | 1/1982 | Prudenziati | 338/4 |
| 4,481,497 | 11/1984 | Kurtz et al. | 338/2 |

OTHER PUBLICATIONS

"Characteristics and Performances of Thick Film Pressure Sensors for Automotive Applications", Roberto Dell'Acqua et al., pp. 69-75.
"High Pressure Thick Film Monolithic Sensors", Roberto Dell'Acqua et al., pp. 79-87.

*Primary Examiner*—Teresa J. Walberg
*Assistant Examiner*—M. M. Lateff
*Attorney, Agent, or Firm*—Arnold, White & Durkee

[57] ABSTRACT

The invention relates to a pressure sensor including a metallic housing having an open end with an opening, a ceramic diaphragm accommodated within the housing such that the diaphragm is exposed at its one major surface to a pressure of a fluid in an external space through the opening of the housing, and resistors formed integrally on the diaphragm. The electrical resistance of the resistors varies with the pressure acting on the ceramic diaphragm, whereby the pressure is determined by the electrical resistance. An electromagnetic shielding member is disposed within the metallic housing such that the shielding member is positioned between the resistor or resistors and the open end of the metallic housing. The shielding member is adapted to protect the resistors from an electromagnetic wave in the external space.

12 Claims, 2 Drawing Sheets

PRESSURE SENSOR HAVING MEANS FOR ELECTROMAGNETICALLY SHIELDING RESISTORS

BACKGROUND OF THE INVENTION

1. Field of the Invention

The present invention relates generally to a ceramic pressure sensor or detector, and more particularly to a ceramic pressure sensor suitable for measuring or determining a pressure acting on a ceramic diaphragm with electrical resistors formed thereon, depending upon a variation in the resistance value of the resistors due to deformation or strain of the diaphragm in response to the pressure applied thereto.

2. Discussion of the Prior Art

There is known a pressure sensor of a type in which electrical resistors connected in a bridge configuration are integrally formed on a surface of a suitable deformable diaphragm or substrate. Deformation or strain of the diaphragm in response to a pressure applied thereto causes a change in the electrical output of the bridge circuit of the resistors, whereby the pressure acting on the diaphragm may be determined by the electrical signal produced by the bridge circuit. Examples of this type of pressure sensor have recently been proposed in SAE Reports 820319 and 860474, wherein the diaphragm is formed of a ceramic material.

In the pressure sensor employing such a ceramic diaphragm, a plurality of resistors 10 are integrally formed on one of opposite major surfaces of the ceramic diaphragm in the form of a thin film or sheet 12. The ceramic diaphragm 12 is retained within a bore of a cylindrical metallic housing 16, such that the diaphragm 12 is fixed at its outer circumferential portion by a ceramic support body 14 also accommodated in the metallic housing 16. The metallic housing 16 has an open end having an opening 18, through which the other major surface of the ceramic diaphragm 12 is exposed to an atmosphere in an external space. Thus, the ceramic diaphragm 12 having the integrally formed resistors 10 is exposed to a pressure of the external atmosphere introduced through the opening 18 at the open end of the metallic housing 16.

The pressure sensor constructed as described above is suitably used for measuring a pressure in a space exposed to a relatively high temperature. In this case, an electrical output of the resistors 10, representative of the pressure acting on the ceramic diaphragm 12, is likely to be influenced by an electromagnetic wave in the measuring space or environments. Thus, the measuring accuracy of the pressure sensor is deteriorated by such an electromagnetic disturbance.

For instance, where the pressure sensor is utilized for measuring the pressure within a cylinder bore of an internal combustion engine, i.e., for determining the combustion pressure of the engine, the electrical output of the sensor is affected by an electromagnetic wave or noise which occurs upon energization of ignition or spark plugs of the engine, whereby the pressure represented by the obtained electrical output of the pressure sensor includes a certain amount of error or deviation from the actual pressure in the cylinder bore.

SUMMARY OF THE INVENTION

It is therefore an object of the present invention to provide a pressure sensor using a resistor or resistors formed on a ceramic diaphragm, whose electrical output is free of an influence by an electromagnetic wave in an external measurement space.

The above object may be attained according to the concept of the present invention, which provides a pressure sensor including a metallic housing having an open end having an opening, a ceramic diaphragm accommodated within the metallic housing such that the ceramic diaphragm is exposed at one of opposite surfaces thereof to a pressure of a measurement fluid in an external space through the opening at the open end of the metallic housing, and at least one resistor which is formed integrally on the ceramic diaphragm and whose electrical resistance value varies with the pressure acting on the one surface of the ceramic diaphragm, whereby the pressure is determined by the electrical resistance value, wherein a shielding member is disposed within the metallic housing such that the shielding member is positioned between the at least one resistor and the open end of the metallic housing. The shielding member is adapted to protect the at least one resistor from an electromagnetic wave, disturbance or noise in the external space.

In the pressure sensor of the present invention constructed as described above, the resistor or resistors on the ceramic diaphragm is/are electromagnetically shielded by the metallic housing and the shielding member, with respect to the external measurement space in which an atmosphere whose pressure is to be measured exists. Consequently, an influence of an electromagnetic wave or noise in the external space on the electrical output of the pressure sensor is effectively lowered or substantially eliminated. Thus, the present pressure sensor permits sufficiently accurate determination of the pressure in the external space, with substantially no influence by the environmental electromagnetic disturbance.

When the instant pressure sensor is used to measure the pressure within a cylinder bore of an internal combustion engine, the electrical output of the sensor is suitably protected from an electromagnetic wave produced upon energization of spark or ignition plugs of the engine, whereby the pressure in the cylinder bore may be precisely determined without an adverse influence by such an electromagnetic wave.

In one form of the present invention, the resistor or resistors is/are formed on the other major surface of the ceramic diaphragm, remote from the shielding member, and the shielding member covers the major surface of the ceramic diaphragm exposed to the pressure in the external space. In this case, the shielding member may be covered by a suitable protective member.

In another form of the invention, the shielding member is disposed such that the shielding member is spaced apart from the major surface of the ceramic diaphragm on which the resistor or resistors is/are formed.

The shielding member may be suitably formed on the major surface of the ceramic diaphragm, by forming an unfired thin film of an electrically conductive material on an unfired ceramic body for the ceramic diaphragm, and co-firing the unfired thin film with the unfired ceramic body.

The pressure sensor may further comprise a support body disposed in contact with the major surface of the ceramic diaphragm, remote from the shielding member, and an annular washer which cooperates with the support body to retain the ceramic diaphragm and the shielding member. In this case, the metallic housing may have a radially inward flange defining the opening at the open end thereof. The annular washer may be disposed between the flange and the shielding member. Alternatively, the annular washer may be disposed such that the shielding member is disposed between the flange and the annular washer. In this instance, the shielding member has a porous structure through which the pressure in the external space acts on the ceramic diaphragm.

BRIEF DESCRIPTION OF THE DRAWINGS

The above and optional objects, features and advantages of the present invention will become more apparent by reading the following detailed description of presently preferred embodiments of the invention, when considered in connection with the accompanying drawings, in which.

DETAILED DESCRIPTION OF THE PREFERRED EMBODIMENTS

Figure 1:
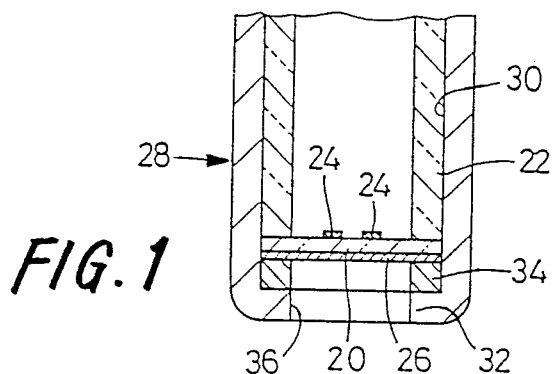
FIG. 1 is a fragmentary elevational view in longitudinal cross section of one embodiment of a pressure sensor of the invention.

Referring first to FIG. 1, reference numeral 20 denotes a ceramic diaphragm of a pressure sensor, which is deformable in response to a pressure applied thereto. The ceramic diaphragm 20 is a round sheet or film member formed of a ceramic material. The ceramic diaphragm 20 is retained in an end portion of a bore 30 formed in a cylindrical metallic housing 28. More specifically, a cylindrical ceramic support body 22 is provided within the bore 30 of the metallic housing 28, such that one end portion of the support body 22 terminates in the outer circumferential portion of the ceramic diaphragm 20, at an inner major surface of the diaphragm 20. Thus, the ceramic diaphragm 20 is retained by or secured to the support body 22.

Described more specifically, the circular ceramic diaphragm 20 and the cylindrical ceramic support body 22 are formed as an integral body, by a known technique using a suitable known ceramic material such as alumina, zirconia, mullite or silicon nitride. An unfired, formed mass of the selected ceramic material is fired into the ceramic structure 20, 22. Although the diaphragm 20 and the support body 22 may be formed and fired separately and then joined together into the integral structure 20, 22 by a glass or other bonding material, it is desirable that an integral formed ceramic mass be fired into the ceramic body 20, 22, as proposed in copending U.S. patent application Ser. No. 07/197,312 (filed May 23, 1988), from the standpoint of heat and pressure resistances, and sensing accuracy of the pressure sensor.

On the inner major surface of the ceramic diaphragm 20 at which the diaphragm 20 and the support body 22 are joined together, there are formed a plurality of electrical resistors 24 and electrically conductive strips (not shown) which connect the resistors 24 in a bridge configuration or arrangement as known in the art, so as to form a Wheatstone bridge circuit, for example. These resistors 24 and the conductive strips are formed by printing or other techniques, by using suitable electrically resistive and conductive materials, before or after the diaphragm 20 is fired.

The bridge arrangement or circuit formed by the resistors 24 and conductive strips serves as strain detector means whose electrical output varies with an amount of deformation or strain of the ceramic diaphragm 20 in response to a pressure applied thereto. That is, when the ceramic diaphragm 20 is stressed and deformed, the resistance values of the resistors 24 decrease or increase, and the electrical output of the bridge circuit is fed to an external device, to measure the amount of strain of the diaphragm 20 which represents the pressure or stress acting thereon. While the resistors 24 and the conductive strips may be formed of any materials used in the art, in particular for the resistors 24 it is preferable to use a mixture which consists substantially of a selected electrically conductive component having excellent high-temperature characteristics, and a selected dielectric component consisting of a glass or ceramic material, so that the bridge circuit is highly durable in high-temperature environments.

The other major surface of the ceramic diaphragm 20, remote from the resistors 24 and support body 22, is substantially entirely covered by a thin shielding layer 26 integrally formed thereon.

The shielding layer 26 is formed of an electrically conductive composition which consists of a suitable electrically conductive material such as Pt, Au, Ag, Pd, Ni or W as a major component, and a glass or ceramic material. The prepared electrically conductive composition for the shielding layer 26 is applied by screen printing to a green sheet for the ceramic diaphragm 20. Alternatively, the electrically conductive composition is applied by a plating or spraying technique to the fired ceramic diaphragm 20. The thickness of the shielding layer 26 is determined to be sufficiently small, for example, in the neighborhood of 10 microns, in order to avoid reduction or loss of the flexible nature of the ceramic diaphragm 20, and thereby assure sufficient sensitivity of the diaphragm 20 to the pressure applied thereto.

As indicated above, the ceramic diaphragm 20, formed with the resistors 24 and the shielding layer 26, and the ceramic support body 22 are fixedly accommodated in the bore 30 of the cylindrical metallic housing 28. This metallic housing 28 has an open end which has a radially inward flange 32 which defines an opening 36. The outer surface of the ceramic diaphragm 20 covered with the shielding layer 26 is exposed to the pressure in the external space, through the opening 36 at the open end of the housing 28.

Between the shielding layer 26, covering the outer surface of the ceramic diaphragm 20, and the inner surface of the inward flange 32, there is disposed a metallic annular washer 34 such that the support body 22 and the annular washer 34 cooperate with each other to hold the ceramic diaphragm 20 and the shielding layer 26 therebetween. Since the shielding layer 26 is held in abutting contact with the annular washer, the shielding layer 26 is electrically connected to the metallic housing 28 via the metallic annular washer 34.

When the thus constructed pressure sensor is used to measure the pressure in a cylinder bore of an internal combustion engine, for example, the metallic housing 28 is positioned such that the opening 36 (pressure inlet hole) communicates with the cylinder bore, so that the pressure in the cylinder bore is applied through the opening 36 to the outer surface of the ceramic diaphragm 20 protected by the shielding layer 26. As well known in the art, the cylinder bore pressure acting on the ceramic diaphragm 20 causes the diaphragm 20 to be accordingly deformed, whereby the electrical resistance value of the bridge circuit of the resistors 24 is accordingly changed. Thus, the pressure in the cylinder bore is detected as a variation in the electrical output of the bridge circuit. Usually, the pressure sensor is installed with the metallic housing 28 being grounded. For example, the metallic housing 28 is electrically connected to the cylinder of the engine.

In the instant pressure sensor, the resistors 24 whose electrical output varies with a change in the amount of deformation or strain of the ceramic diaphragm 20 are surrounded by the metallic housing 28 and the shielding layer 26, and are thus electromagnetically shielded from the external space, i.e., protected from an electromagnetic field in the external space. Consequently, the instant arrangement effectively reduces or substantially eliminates an influence of an electromagnetic wave or noise in the external space, on the electrical output of the sensor (resistors 24).

Therefore, when the pressure sensor is used to measure the pressure in the cylinder bore of an engine, the shielding layer 26 cooperates with the metallic housing 28 to substantially eliminate an influence of the electrical output of the resistors 24 by an electromagnetic wave or noise which occurs upon energization of the spark plugs of the engine. Accordingly, the pressure in the cylinder bore can be measured with significantly improved accuracy.

Figure 2A:
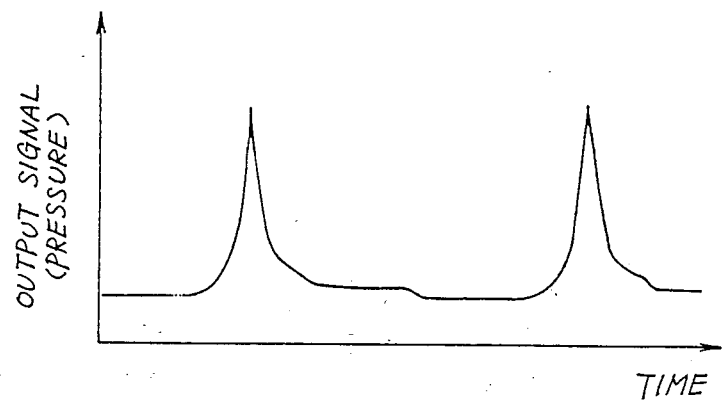
FIG. 2(a) is a graph showing an electrical output signal of the pressure sensor of FIG. 1, which represents the pressure in a cylinder bore of an internal combustion engine.
Figure 2B:
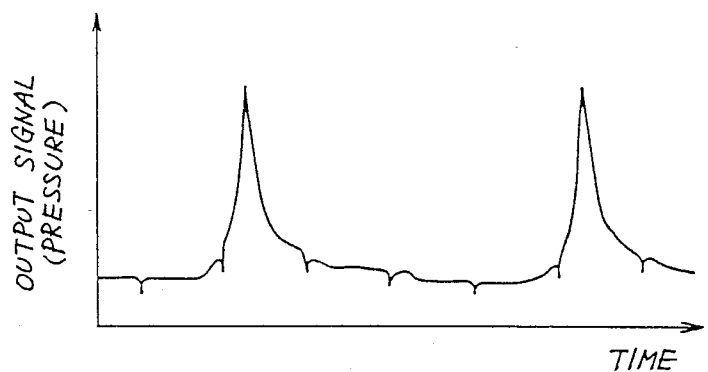
FIG. 2(b) is a graph showing the electrical output signal of a conventional pressure sensor, which also represents the cylinder bore pressure.

An experiment was conducted on the present pressure sensor, to measure the pressure in one of four cylinder bores of an internal combustion gasoline engine. The experiment revealed that the output of the sensor accurately represented the actual change of the cylinder bore pressure, without any influence by the electromagnetic wave produced by the spark plugs of the engine, as indicated in the graph of FIG. 2(a). For comparison, the graph in FIG. 2(b) shows an electrical output signal obtained on a conventional pressure sensor wherein the ceramic diaphragm is not protected by a shielding layer (26) as provided in the instant sensor according to the invention. It will be understood from the graphs of FIGS. 2(a) and 2(b) that the electrical output of the conventional sensor is considerably influenced by the electromagnetic wave which is produced not only by the spark plug for the cylinder bore in which the conventional sensor is installed, but also by the spark plugs for the other cylinder bores of the engine.

Figure 3:
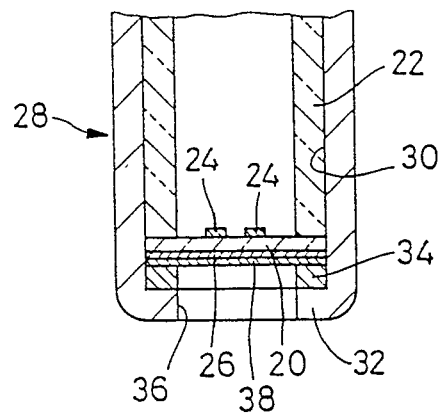
FIGS. 3 and 4 are fragmentary elevational views corresponding to that of FIG. 1, showing modified embodiments of the invention.
Figure 4:
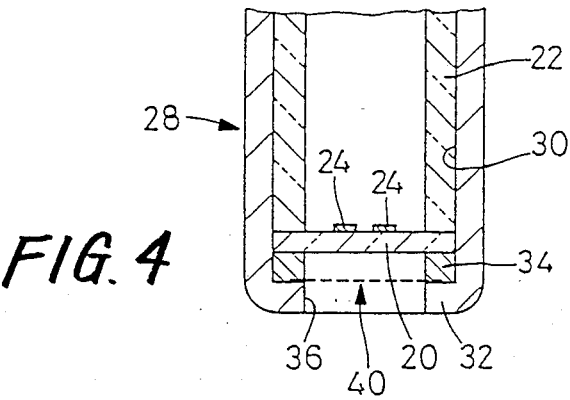
Figure 5:
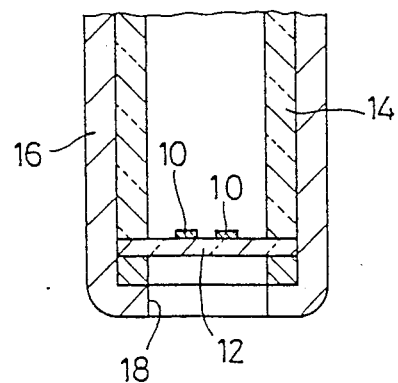
FIG. 5 is a fragmentary elevational view in longitudinal cross section, illustrating a conventional pressure sensor.

Referring next to FIGS. 3 and 4, there are illustrated modified embodiments of the present invention. In the interest of brevity and simplification, the same reference numerals as used in FIG. 1 will be used in FIGS. 3 and 4, to identify the functionally corresponding components, and no redundant description of these components will be provided.

In the pressure sensor of FIG. 3, the entire outer surface of the shielding layer 26, covering the ceramic diaphragm 20, is protected by a protective layer 38 formed thereon.

The protective layer 38 is a thin film formed of a highly heat-resistant material such as alumina or beryllia. For example, the protective layer 38 is formed by applying a selected heat-resistant material by a screen printing or suitable deposition technique, to the exposed surface of the screen-printed shielding layer 26 of an electrically conductive material formed on the unfired green sheet of the ceramic diaphragm 20. The thickness of this protective layer 38 is also determined to be relatively small, for example, in the neighborhood of 10 microns, in order to avoid reduction or loss of the flexible nature of the ceramic diaphragm 20 and thereby assure sufficiently high sensitivity of the diaphragm 20 to the pressure applied thereto.

The shielding layer 26 is electrically connected to the grounded conductor of the electric circuit including the resistors 24, by means of a suitable conductor formed by a suitable method such as a through-hole plating technique.

In the instant modified pressure sensor of FIG. 3, the shielding layer 26 provides the same advantages as offered by the shielding layer 26 provided in the pressure sensor of the preceding embodiment. In addition, the protective layer 38 serves to protect the shielding layer 26 from a direct exposure to a combustion flame in the cylinder bore of an internal combustion engine, when used for measuring the pressure in the cylinder bore. The protective layer 38 therefore effectively increases the durability of the pressure sensor.

In the modified pressure sensor of FIG. 4, a modified shielding layer 40, alternative to the shielding layer 26 of FIG. 1, is used to protect the ceramic diaphragm 20 from an external electromagnetic wave. Described in greater detail, the shielding layer 40 is formed separately from the ceramic diaphragm 20, namely, spaced apart from the ceramic diaphragm 20 in the direction toward the open end of the metallic housing 28. The shielding layer 40 is held in place between the inner surface of the inward flange 32, and the annular washer 34 which cooperates with the ceramic body 22 to retain the ceramic diaphragm 20 therebetween. In this arrangement, the shielding layer 40 closes the opening 36 defined by the inward flange 32.

Like the shielding layer 26, the shielding layer 40 is formed of a suitable electrically conductive material. However, the shielding layer 40 has a porous structure having a mesh network or multiplicity of minute pores, so that the pressure in the external space may act on the ceramic diaphragm 20 through the porous structure of the shielding layer 40. The shielding layer 40 is electrically connected to the metallic housing 28. The shielding layer 40 cooperates with the metallic housing 28 to surround the resistors 24, thereby electromagnetically shielding the resistors 24 from the external measurement space.

Like the shielding layer 26 provided in the first embodiment, the shielding layer 40 effectively reduces or substantially eliminates an influence of the external electromagnetic wave on the electrical output of the pressure sensor, thus assuring sufficiently high accuracy of measurement of the external pressure.

While the present invention has been described above in its presently preferred embodiments, it is to be understood that the invention is not limited to the precise details of the illustrated embodiments, but may be embodied with various changes and modifications.

For instance, the shielding layer provided according to the principle of the present invention may be embedded within the mass of the ceramic diaphragm 20.

Further, the illustrated embodiments have been described as being suitably used for measuring the pressure in a cylinder bore of an internal combustion engine. The pressure sensor constructed according to the principle of the present invention can be equally suitably used for measuring or determining the pressure of a fluid existing in an environment subjected to an electromagnetic wave.

It will be understood that the present invention may be embodied with various other changes, modifications and improvements, which may occur to those skilled in the art, in the light of the foregoing teachings, without departing from the spirit and scope of the invention defined in the following claims.

What is claimed is:

1. A pressure sensor comprising:
   a metallic housing having an end with an opening formed therethrough;
   a ceramic diaphragm positioned within said metallic housing such that said ceramic diaphragm is exposed at one of opposite major surfaces thereof to a pressure of a measurement fluid in an external space through said opening at the end of said metallic housing;
   at least one resistor formed integrally on the other of said opposite major surfaces of said ceramic diaphragm, an electrical resistance value of said at least one resistor varying with said pressure acting on said one major surface of said ceramic diaphragm, whereby said pressure is determined by said electrical resistance value; and
   a shielding member formed as a film on said one major surface of said ceramic diaphragm, thereby covering said one major surface and protecting said at least one resistor from an electromagnetic wave in said external space.

2. The pressure sensor of claim 1, further comprising a protective member for covering said shielding member.

3. The pressure sensor of claim 1, wherein said shielding member is disposed such that said shielding member is spaced apart from said one major surface of said ceramic diaphragm.

4. The pressure sensor of claim 1, wherein said shielding member is formed on said one major surface of said ceramic diaphragm, by forming an unfired thin film of an electrically conductive material on an unfired ceramic body for said ceramic diaphragm, and co-firing said unfired thin film with said unfired ceramic body.

5. The pressure sensor of claim 1, further comprising a support body disposed in contact with the other of said opposite major surfaces of said ceramic diaphragm, and an annular washer which cooperates with said support body to retain said ceramic diaphragm and said shielding member in said metallic housing.

6. The pressure sensor of claim 5, wherein said metallic housing has a radially inward flange defining said opening at said end thereof, and said annular washer is disposed between said flange and said shielding member.

7. The pressure sensor of claim 1, wherein said film of said shielding member has a thickness of about 10 microns.

8. The pressure sensor of claim 5, wherein said annular washer is made of an electrically conductive material.

9. A pressure sensor comprising:
   a metallic housing having an end with an opening formed therethrough;
   a ceramic diaphragm accommodated within said metallic housing such that said ceramic diaphragm is exposed at one of opposite major surfaces thereof to a pressure of a measurement fluid in an external space through said opening of said metallic housing;
   at least one resistor formed integrally on the other of said opposite major surfaces of said ceramic diaphragm, an electrical resistance value of said at least one resistor varying with said pressure acting on said one major surface of said ceramic diaphragm, whereby said pressure is determined by said electrical resistance value; and
   a shielding member disposed between said one major surface of said ceramic diaphragm and said open end of said metallic housing such that said shielding member is spaced apart from said one major surface, said shielding member having a porous structure through which said pressure in said external space acts on said one major surface of said ceramic diaphragm.

10. The pressure sensor of claim 9, further comprising an annular washer disposed between said ceramic diaphragm and said shielding member such that said ceramic diaphragm is supported by said annular washer.

11. The pressure sensor of claim 10, wherein said metallic housing has a radially inward flange defining said opening at said end thereof, said shielding member being disposed between said flange and said annular washer.

12. The pressure sensor of claim 10, wherein said annular washer is made of an electrically conductive material.

* * * * *